United States Patent  [15] 3,685,678
Ritzenhoff  [45] Aug. 22, 1972

[54] SCREW CAP FOR A CONTAINER
[72] Inventor: Hermann Ritzenhoff, Marburg an der Lahn, Germany
[73] Assignee: Gebruder Seidel KG, Marburg/Lahn, Germany
[22] Filed: July 29, 1970
[21] Appl. No.: 59,254

[30] Foreign Application Priority Data
Aug. 4, 1969  Germany..........P 19 39 553.0

[52] U.S. Cl.......................215/43 A, 215/40, 220/39
[51] Int. Cl. ............................................B65d 41/04
[58] Field of Search........215/43 R, 43 A, 40; 220/39

[56] References Cited
UNITED STATES PATENTS
3,199,704  8/1965  Davidson................215/43 A
3,315,830  4/1967  Flynn.......................215/43 A
3,249,248  5/1966  Metzendorf et al......215/43 A Primary Examiner—George T. Hall
Attorney—George F. Dvorak, Stephen T. Skrydlak and Marden S. Gordon

[57] ABSTRACT

The invention provides a screw cap for a container wherein the cap has inner and outer sleeves, with a sealing member within, integral and transverse to the inner sleeve. The inner sleeve and sealing member are of hard plastics material, but the sealing member is thin enough to be sealingly resilient. A chamber between the sealing member, and a closed end of the outer sleeve prevents diffusion of aroma through the cap from the container.

8 Claims, 6 Drawing Figures

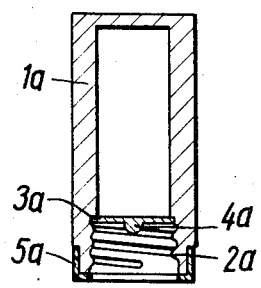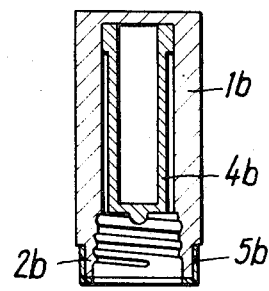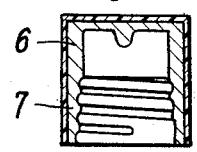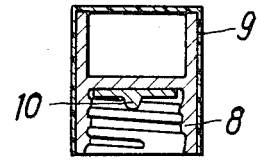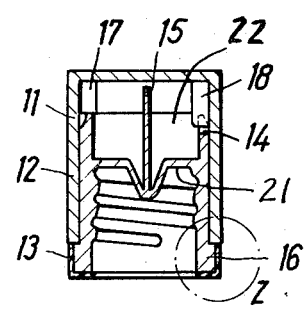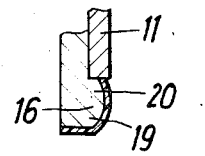

SCREW CAP FOR A CONTAINER

The invention relates to a screw cap for a container. The invention particularly relates to a screw cap made preferably from thermoplastics material and intended for cosmetics containers and the like.

Various two-part screw caps are known having outer and inner sleeves made from different materials, for example glass-plastics or metal-plastics.

Such decorative screw caps can have inner and outer sleeves made from plastics, the outer sleeve being of a hard plastics material and the inner sleeve (or at least a sealing disc) being of soft plastics material.

Decorative screw caps are frequently relatively "-high," i.e., they have a body which is longer than is in fact necessary, so that a cavity is formed within the outer sleeve which is not used. They normally have a screwthread on the lower, open ends, and a sealing or packing disc or an inner sleeve the bottom of which serves as a sealing or packing disc.

Known screw caps are, for reasons of strength, generally made from a plastics material of high hardness whereas the sealing disc is made from a soft plastics material so as to be flexible. Because the screwthread is at the open end, it is not possible to make the internal diameter of the upper parts greater than the smallest diameter of the screwthread, so that the upper wall thickness is greater than it need be, and excess material is used. Also, because of the variations in wall thickness, injection moulding and curing can be difficult, and accuracy is difficult to attain while manufacture is relatively lengthy in time. There is also a tendency for the packing or sealing discs to drop out, and this can be difficult to position.

The sealing disc must also be firmly positioned and quite strong so that it firmly engages the opening in the container. It must therefore be thick, but also resilient to give a good seal. If the screw cap is used for cosmetic containers, the sealing disc must be thick enough to reduce permeation of the aroma therethrough to acceptable limits.

It is an object of the present invention to provide an improved screw cap for a container.

According to the invention, there is provided a screw cap for a container, said cap including an outer sleeve with a closed end, containing an inner sleeve carrying a screw thread and having a substantially transverse sealing member integral therewith, wherein a chamber is defined between the sealing face, closed end and sleeves, and the inner sleeve and sealing face are of hard plastics material, the sealing member being sufficiently thin to be sealingly resilient.

The screw cap may include a hollow conical portion at the end of the inner sleeve adjacent the closed end of the outer sleeve. A support for the sealing member can be provided in the chamber. The support may comprise a pin fixed to either the sealing member or the closed end of the outer sleeve.

The screw cap may have abutments between the end of the inner sleeve and the closed end of the outer sleeve. The abutments may be in the form of annular ribs, and further ribs can be provided extending therefrom, to engage, for instance, in notches in the inner end of the inner sleeve.

The inner sleeve can be held in the outer sleeve by means of, for instance, annular projection on one sleeve engaging in corresponding recesses in the other sleeve.

An advantage of the present invention is that two identical or similar plastics materials are used for the outer and inner sleeves, with satisfactory sealing being assured by the thin sealing member. Although aroma may diffuse through this thin sealing member, it only diffuses into the chamber, and does not go further. The chamber acts as a buffer for the aroma. The sealing member is supported by the inner sleeve.

With screw caps according to the invention, the wall thickness, particularly of the outer sleeve, is substantially uniform, so that injection moulding of thermoplastics materials is extremely easy, and curing of thermosetting materials in the required shape is also easy. Manufacturing times are short, and material consumption small, while good accuracy can be obtained.

The screw cap may also have a decorative ring abutting the open end of the outer sleeve and preferably supported on the inner sleeve. The ring may be positioned on a projecting rim on the inner sleeve, the external edges of the rim being rounded to facilitate the application of the ring. This arrangement is made possible by the two-part moulding of the screw cap of the invention.

In order that the invention may be more clearly understood, the following description is given, merely by way of example, with reference to the accompanying drawings, in which:

FIGS. 1 – 4 show known screw caps,

FIG. 5 shows a section through one form of screw cap according to the invention, and FIG. 6 shows a detail of FIG. 5, drawn to a larger scale.

A known screw cap, 1a, which is made in one piece, is shown in FIG. 1. It has a screwthread 2a at its open end, and narrows above this to provide a face 3a against which bears a sealing disc 4a. A decorative ring 5a, made from metal, is fitted in a recess near the open end. The cap is made from plastics material of high hardness, with the sealing disc 4a of soft plastics to provide a good seal.

FIG. 2 shows a screw cap having a cup 4b the open end of which contacts the bottom of the cap 1b and the head of which comprises a sealing face. Less material is required for the cap in this case, but more material is required for the cap 4b than for the sealing disc 4a used in the screw cap of FIG. 1.

FIG. 3 shows a screw cap with an external sleeve 6 and an inner sleeve 7 made from a soft thermoplastics material. In this case, the outer sleeve supports the inner sleeve, and contacts it over a wide area. The inner sleeve is relatively thick which is undesirable.

The screw cap of FIG. 4 has a separate sealing insert 10 within an inner sleeve 8 and an outer sleeve 9 which, for decorative purposes, may be designed to have any desired height.

The screw cap according to the invention which is shown in FIG. 5 consists of an outer sleeve 11 and an inner sleeve 12. The inner sleeve 12 has an internal screwthread located just below a transverse sealing member 21 integral with the inner sleeve. The inner sleeve also carries a decorative ring 13. The inner sleeve is made of a relatively hard thermoplastics material, such as for example polypropylene, and the integral sealing member 21 is of the same material, but is sufficiently thin to be suitably resilient. Material from within the container to be sealed may diffuse through the thin sealing member into the chamber 22 defined by the sealing member, the closed end of the outer sleeve and the inner sleeve. This chamber acts as a buffer, preventing the aroma dissipating further. It need only be charged with aroma once, as the cap is not normally removed form the container long enough to allow diffusion out of the chamber again. Thus an aromatic seal is achieved even with the thin sealing member.

Assembly of the screw cap is facilitated by a conical portion 14 at the inner end of the inner sleeve.

The sealing member is supported as shown by pin 15 attached thereto. It could equally be attached to the end of the outer sleeve, or a planar support could be used.

When the inner sleeve is pressed into the outer sleeve on assembly, it is stopped by a projecting rim 16 at its lower end, and, or by arresting ribs 17 arranged internally in the outer sleeve 11.

A latching effect between the inner and outer sleeve is achieved by relatively deep ribs 18 within the outer sleeve 11 which engage in corresponding recesses formed in the conically tapered end 14 of the inner sleeve.

The latching effect between the inner and outer sleeves may be improved by providing interengaging ribs and grooves on the contacting surfaces. The rims and grooves are preferably tapered, and of sawtooth shape.

A projecting edge 16 on the inner sleeve 12 has two externally positioned edges 19 and 20. The rounding of the edge 19 facilitates pushing-on of the decorative ring 13 while the rounding of the edge 20 ensures that the rim stays in place. This double rounded edged shape could previously only be obtained with a separate manufacturing step, but can be made in this case by having a two-part mould for the inner sleeve, with a dividing line at the highest part of the rim 16.

We claim:

1. A two-piece decorative screw cap for a cosmetic container and the like, said cap comprising in combination:
   a an elongate outer sleeve;
   b an end wall to said outer sleeve, and an end to said outer sleeve remote from said end wall;
   c an inner sleeve located in said outer sleeve and having one end adjacent said end wall, and another end remote from said one end;
   d an axis and an inner surface to said inner sleeve;
   e screw thread means on at least a part of said inner surface;
   f a sealing member located within and integral with said inner sleeve, and being substantially transverse to the axis of said inner sleeve; said sealing member, end wall and sleeves defining a space, and said inner sleeve and said sealing member being of a relatively hard thermoplastics material, said sealing member being sufficiently thin to be sealingly resilient and to permit diffusion into said space.

2. A screw cap as claimed in claim 1, wherein said inner sleeve and sealing face are of polypropylene.

3. A screw cap as claimed in claim 1, further comprising a support for said sealing member located in said space.

4. A screw cap as claimed in claim 3, wherein said support comprises a pin substantially aligned with said axis of said inner sleeve.

5. A screw cap as claimed in claim 1, further comprising abutment ribs in said outer sleeve contacted by said end of said inner sleeve which is adjacent said end wall.

6. A screw cap as claimed in claim 5, further comprising further abutment ribs, means defining notches in said end of said inner sleeve which is adjacent said end wall, said further ribs being engaged in said notches.

7. A screw cap for a container, said cap comprising in combination:
   a an outer sleeve;
   b an end wall to said outer sleeve, and and end to said outer sleeve remote from said end wall;
   c an inner sleeve located in said outer sleeve and having one end adjacent said end wall, and another end remote from said one end;
   d an axis and an inner surface to said inner sleeve;
   e screw thread means on at least a part of said inner surface;
   f a sealing member located within and integral with said inner sleeve, and being substantially transverse to the axis of said inner sleeve; said sealing member, end wall and sleeves defining a space, and said inner sleeve and said sealing member being of a hard plastics material, said member being sufficiently thin to be sealingly resilient and a decorative ring supported on said inner sleeve and abutting said outer sleeve at said end thereof remote from said end wall.

8. A screw cap as claimed in claim 7, further comprising an outwardly projecting rim having rounded edges on said inner sleeve at said another end thereof, said decorative ring being disposed on said rim.

* * * * *